No. 695,504. Patented Mar. 18, 1902.
A. H. STEWART.
CONDUCTOR CARRIER.
(Application filed Dec. 9, 1901.)
(No Model.) 2 Sheets—Sheet 1.

Witnesses
Inventor
Austin H. Stewart
By
Attorney

UNITED STATES PATENT OFFICE.

AUSTIN HARMON STEWART, OF NASHVILLE, TENNESSEE.

CONDUCTOR-CARRIER.

SPECIFICATION forming part of Letters Patent No. 695,504, dated March 18, 1902.

Application filed December 9, 1901. Serial No. 85,229. (No model.)

*To all whom it may concern:*

Be it known that I, AUSTIN HARMON STEWART, a citizen of the United States, residing at Nashville, in the county of Davidson and State of Tennessee, have invented certain new and useful Improvements in Conductor-Carriers; and I do hereby declare the following to be a full, clear, and exact description of the invention, such as will enable others skilled in the art to which it appertains to make and use the same.

This invention relates to conductor-carriers; and it is embodied in the construction and arrangements of parts presently to be described, and defined in claims.

The invention may be considered as being an improvement on that type of conductor-carrier intended to convey a conductor from one support to another, the carrier traveling on a wire or cable stretched between the supports.

Carriers heretofore have been made with spring propelling means and have been so arranged that the traction-wheel bears against the under side of the supporting-wire largely for the purpose of preventing disengagement of the trolley or traction wheel from the wire. Conductor-carriers have also been suggested wherein the traction or trolley wheel serves as a carrying-wheel resting and traveling on the upper side of the wire. Such constructions, however, have been quite complicated and very heavy for the purpose intended. They have also been open to the objection of accidental displacements caused by vibrations of the supporting-wire, and so owing largely to the improper balancing and faulty structure and arrangement of associated parts.

The aim and purpose of my invention is to provide a conductor-carrier having a carrying or trolley wheel so arranged in relation to the driving power that it may be properly suspended on a wire, to provide a structure wherein the danger of jumping the wire is largely prevented, and a carrier which in its general structure will be light, compact, and durable.

In the accompanying drawings I have shown a carrier embodying the invention; but I desire it understood that the invention is not limited to the particular and special arrangement and construction, as it is obvious that various changes can be made without departing from the principle of the invention.

Figure 1:
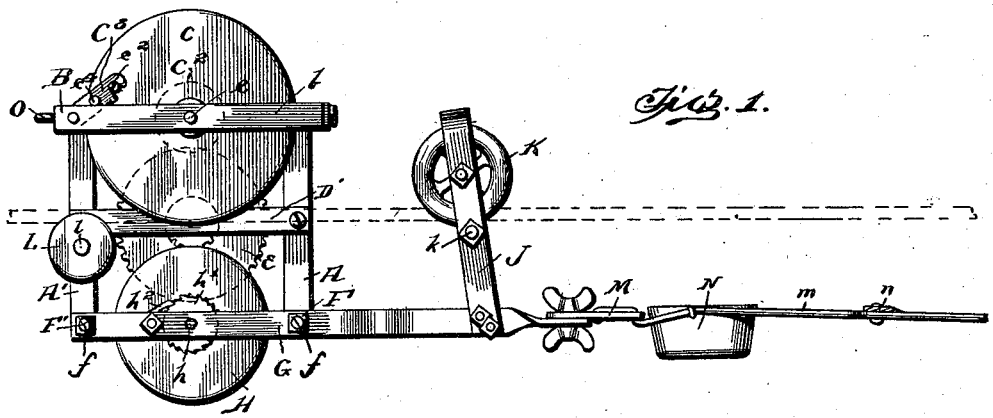
Figure 2:
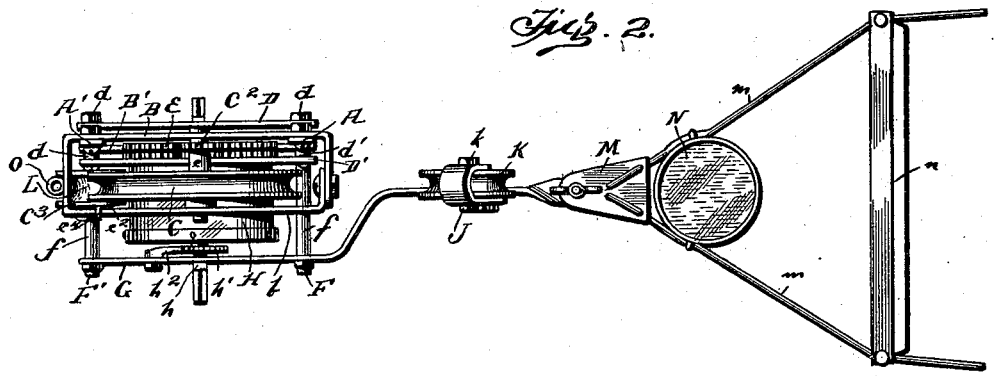
Figure 3:
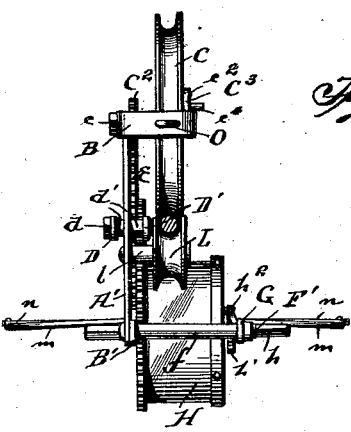
Figure 4:
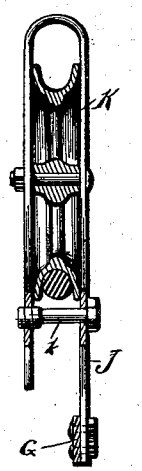
Figure 5:
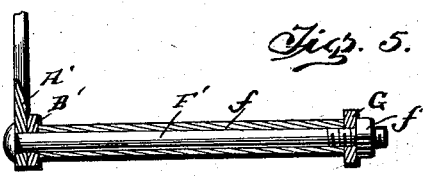

Figure 1 is a side elevation of a carrier embodying the invention. Fig. 2 is a plan view. Fig. 3 is a rear elevation, and Figs. 4 and 5 are detail views.

The frame of the carrier consists, primarily, of a rectangular frame composed of upright side bars A A' and bottom and top connecting-bars B and B'. The upper bar B has its ends extended transversely, and one end is extended longitudinally, as at $b$, to form, in conjunction with the opposite portion of the bar, the side bars to a substantially rectangular frame arranged, as will be seen, in a horizontal plane. In the frame so formed is mounted the carrying or trolley wheel C, having a grooved periphery. The wheel is mounted on an axle $c$, secured in the side bars of the horizontal frame.

D designates a cross-bar located midway the main frame and secured to the upright side bars by suitable horizontal bolts $d$, which project through the side bars and carry on their inner end the companion cross-bar D'. These companion cross-bars are spaced apart and held in position by suitable sleeves $d'$ on the bolts $d$ and by suitable nuts clamping the parts in place. Mounted on an axle secured in the companion bars D and D' is a gear E, meshing at its upper edge with a small driving-gear $C^2$, fixed to the hub of carrying-wheel C.

Extending out from the lower ends or corners of the upright frame are two horizontal supporting-bolts F F', which carry on their outer ends a longitudinal bar G, the latter being held in its proper position on the bolts by suitable nuts and interposed sleeves $f$. Mounted in the frame formed by the lower cross-bar of the supporting-frame, the bolts F and F', and the longitudinal bar G is a spring-actuated drum H, the shaft $h$ of which projects through the side bars and at both ends is suitably squared to receive the winding-key. This drum is provided with a ratchet $h'$, which is engaged by a pawl or dog $h^2$, pivoted on the bar G. The gear member of the drum meshes with a pinion on the shaft of the wheel E. The construction and arrangement thus described constitutes a train of driving-gear; but I desire it understood, however, that various other arrangements of gearing may be employed.

To lock the carrier against movement, I secure on the side of the wheel C a pin $c^2$, with which a locking-dog $C^3$ engages, the dog being pivoted to the upper horizontal frame and provided with a suitable thumb-piece, as at $c^4$.

The longitudinal bar G is extended forward beyond the frame and carries on its outer end an upright standard J, the upper end of which is bent back into a substantially U shape and carries between its parallel parts a small guide or trolley wheel K, the same being mounted on a suitable shaft. To position this trolley-wheel in line with the trolley-wheel C, the bar G is offset inwardly. The trolley-wheel K is formed with a grooved periphery, and to prevent the same from escaping from the carrying-wire a cross-bolt $k$ is secured to the standard directly below the trolley-wheel. This cross-bolt is provided with a threaded end portion of a diameter slightly larger than the remaining portion, which threaded end portion engages a thread-hole in the end of the return-bend portion of the standard, while the shank of the bolt is fitted in a hole in the standard and the outer end is capped by a suitable head. By this construction the bolt $k$ is held in its proper position, preventing the spreading of the two opposite parts of the standard, and at the same time the bolt can be moved longitudinally to permit the passage of the carrier-wire to the trolley-wheel above. The bolt is also prevented from accidentally being lost, as the threaded portion is of greater diameter than the opening through which the stem of the bolt passes. Other constructions to effect this purpose may be employed.

In carriages for overhead wires it is necessary to make some provision to prevent the main large driving-wheel from jumping the wire. This is necessary when it is taken into consideration that the carriers are supported on wires which sway back and forth and which incline from the supports to the center. In the construction heretofore described as the carrier moves down the inclined portion of the supporting-wire it is there held in proper upright position, first, by the balancing-weight of the spring-drum and its associated members, and, second, by the forward trolley-wheel, which also acts as a guide. To secure substantially the same guiding effect or holding effect in the rear of the carrier, and so without impeding its movement, I have found it useful to place in the rear of the carrying-wheel a small grooved wheel L. This wheel is mounted on a stub-shaft $l$, extending from the upright bar A' to a point in direct line with the driving-wheel. This grooved wheel is of a length or thickness greater than the thickness of the driving-wheel, and its grooved periphery extends in opposite directions beyond the plane of the side of the driving-wheel. The wheel L is located substantially in line with the base of the driving-wheel, but in the rear thereof. This arrangement of the small grooved retaining-wheel L is such that while it does not impede the movement of the carrier it prevents the same from jumping or escaping from the wire, and owing to its length the carrying-wire can be readily passed down into the groove thereof and thence into the groove of the carrying-wheel, and so without the necessity of the removal of bolts or locking means.

On the forward end of the longitudinal bar G may be conveniently placed any suitable means for removing obstructions on the wires. In the drawings I have shown such to consist of a plate M, adjustably secured on the end of the bar G and carrying two outwardly-diverging arms $m$, to which is secured a burner or torch N. The extreme ends of the arms constitute guides for conducting strings, rags, &c., to the torch. A suitable cross-cutting bar $n$ may be carried by the arms $m$, as shown.

In operation the driving mechanism is wound up, the wheel C released from its locking-dog and placed on the conducting-wire traveling thereover, and in doing so will carry the wire cord or rope to be strung, which latter is attached to an eye O, secured to the frame at any convenient point. The arrangement and position of the small grooved wheel L is such that it does not come in contact with the carrying-wire unless the machine should jump or tilt beyond its normal proper position. By placing the trolley-wheel in front as a guiding-wheel the driving-wheel is less liable to be twisted from the wire. I have found it exceedingly advantageous in constructions of this type to have two carrying-wheels in substantial alinement with each other, the same preventing improper motion of the machine.

It will be seen that the frame of this machine consists of but two upright members, from which the various horizontal frames extend. This is important from a structural point, as it economizes in material and renders the device exceedingly light.

In United States Letters Patent No. 683,515, granted to myself on October 1, 1901, I have shown, described, and claimed a cleaner and carrier. The construction therein shown, however, is claimed as to the cleaner irrespective of any particular carrier, while my present application is for a carrier irrespective of the cleaner, as the same may be employed with or without a cleaner or with any desired style of cleaner—such, for instance, as shown in my said patent or in this application.

Having thus described the invention, what is claimed as new, and desired to be secured by Letters Patent, is—

1. In a conductor-carrier, the combination of an upright frame, a plurality of lateral frames carried thereby, driving-gear and a driving-wheel mounted in said frames, and a trolley-wheel arranged in line with the driving-wheel and supported by the upright frame.

2. The combination with two uprights, of a transverse frame at the top thereof, a driving-wheel mounted in said transverse frame, driving mechanism secured to the lower ends of the uprights, a trolley-wheel secured to the frame and means for locking the driving-wheel against movement.

3. The combination with two uprights of a transversely-arranged frame carried thereby, a driving-wheel mounted in said frame, mechanism for driving said driving-wheel located below the same and carried by the uprights, a longitudinally-extended bar secured to the uprights, and a trolley on said bar arranged in line with the driving-wheel.

4. In a conductor-carrier, the combination with a driving mechanism and a carrying-wheel, a frame supporting the same and means for preventing the escape of the wire from the carrier-wheel, comprising a grooved wheel of a thickness greater than the thickness of the driving-wheel.

5. The combination with a frame, a driving-wheel and driving mechanism located below the wheel, a trolley-wheel in advance of the driving-wheel, a standard carrying the trolley-wheel having two parallel members, and a bolt connecting the ends of the members having means for preventing its escape from one of the members.

6. In a conductor-carrier, the combination with the carrier, of a plate adjustably secured thereto, diverging arms on the plate and a burner or torch carried by the arms.

7. The combination with the conductor-carrier, of a plate adjustably secured thereto, diverging arms on the plate, a torch carried by the arms and located adjacent to the plate, and a cross-piece between the arms, substantially as described.

8. In a carrier for conductors, a single upright frame having secured thereto a plurality of transversely-arranged frames, supporting and driving means mounted respectively in said transverse frames, an extension on one of said frames and a trolley carried by said extension, substantially as described.

In testimony whereof I affix my signature in presence of two witnesses.

AUSTIN HARMON STEWART.

Witnesses:
W. K. McCLARIN,
R. G. CROWLEY.